(12) United States Patent
Dar et al.

(10) Patent No.: US 8,572,627 B2
(45) Date of Patent: Oct. 29, 2013

(54) PROVIDING SUPPLEMENTAL SEMANTICS TO A TRANSACTIONAL QUEUE MANAGER

(75) Inventors: Affan Arshad Dar, Woodinville, WA (US); James E. Johnson, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1162 days.

(21) Appl. No.: 12/256,323

(22) Filed: Oct. 22, 2008

(65) Prior Publication Data

US 2010/0100890 A1     Apr. 22, 2010

(51) Int. Cl.
    G06F 13/00      (2006.01)
(52) U.S. Cl.
    USPC .......................................... 719/313; 719/314
(58) Field of Classification Search
    USPC .................................................. 719/313, 314
    See application file for complete search history.

(56) References Cited

U.S. PATENT DOCUMENTS

| | | | |
|---|---|---|---|
| 5,452,430 A | 9/1995 | Dievendorff et al. | |
| 6,055,560 A * | 4/2000 | Mills et al. | 709/200 |
| 6,154,847 A | 11/2000 | Schofield et al. | |
| 6,226,641 B1 | 5/2001 | Hickson et al. | |
| 7,289,992 B2 | 10/2007 | Walker | |
| 2005/0216916 A1 | 9/2005 | Stall | |
| 2006/0155894 A1 | 7/2006 | Pennington | |
| 2006/0294333 A1 | 12/2006 | Michaylov et al. | |
| 2008/0307111 A1 * | 12/2008 | Wilcock | 709/242 |

OTHER PUBLICATIONS

Peter Houston, Building Distributed Applications with Message Queuing Middleware, http://msdn.microsoft.com/en-us/library/ms811003.aspx, Mar. 1998, 6 Pages, Microsoft Corporation.
Poison Message Handling, http://msdn.microsoft.com/en-us/library/ms789028.aspx, 2007, 5 Pages, Microsoft Corporation.
Puneet Gupta, Transactions Across BizTalk Server, http://msdn.microsoft.com/en-us/library/ms942198(printer).aspx, May 2005, 19 Pages, Microsoft Corporation.

* cited by examiner

*Primary Examiner* — Andy Ho
(74) *Attorney, Agent, or Firm* — Workman Nydegger (57) ABSTRACT

In one embodiment, a computer system instantiates a queue manager configured to process a plurality of existing queue manager commands on messages in a message queue. The computer system instantiates a virtualized instance of a queue manager in a virtual layer associated with the queue manager in the computing system. The virtualized queue manager instance provides supplemental queue manager commands usable in addition to existing queue manager commands, such that the queue manager can be used to implement the supplemental commands without substantial modification. The computer system receives an indication that a message in a message queue is to be accessed according to a specified command provided by the instantiated virtualized queue manager instance that is not natively supported by the queue manager and the virtualized queue manager performs the specified supplemental command as indicated by the received indication by performing one or more existing queue manager commands.

20 Claims, 5 Drawing Sheets

PROVIDING SUPPLEMENTAL SEMANTICS TO A TRANSACTIONAL QUEUE MANAGER

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In many cases, software applications are designed to interact with other software applications or other computer systems. Software applications often use multiple different processes and/or threads to perform tasks. These threads and processes are also configured to communicate with each other. Such communication often occurs through the use of a message queue. Message queues are typically managed by queue managers. Generally, queue mangers are configured to deliver messages on the queue and dispose of messages that have been successfully read from the queue. In this manner, the queue is kept up-to-date, even while the queue is constantly changing. Queue managers may also be configured to deliver messages between queues hosted by other queue managers.

Typically, queue managers include a set of commands or semantics that can be used by outside applications to access features of the queue manager. For example, a queue manager may include a receive-message command that accesses and returns a message from the head of the queue. Many other such commands may be included in the queue manager's set of available commands. These commands, however, are generally hard-coded into the queue manager application, and, as a result, updating or adding to the set of available commands may involve a great deal of modification to the queue manager application.

BRIEF SUMMARY

Embodiments described herein are directed to instantiating a virtualized instance of a queue manager configured to provide a plurality of supplemental queue manager commands for performing message access operations. In one embodiment, a computer system instantiates a queue manager configured to process a plurality of existing queue manager commands on messages in a message queue. The computer system instantiates a virtualized instance of a queue manager in a virtual layer associated with the queue manager in the computing system. The virtualized queue manager instance provides supplemental queue manager commands usable in addition to existing queue manager commands, such that the queue manager can be used to implement the supplemental commands without substantial modification. The computer system receives an indication that a message in a message queue is to be accessed according to a specified command provided by the instantiated virtualized queue manager instance that is not natively supported by the queue manager and the queue manager performs the specified supplemental command as indicated by the received indication by performing one or more existing queue manager commands.

In another embodiment, a computer system performs a method for replacing an internal transaction with an external transaction. The computer system receives an indication that a first message in a message queue is to be accessed according to a peek-lock command provided by an instantiated virtualized queue manager instance. The computer system calls a begin-queue-transaction command to initiate a transaction internal to the queue manager. The computer system calls a receive-message command to access the first message within the internal transaction. The computer system records the internal transaction identified with a unique identifier in a portion of virtual layer state and locks the first message in the message queue according to the received peek-lock command. The computer system also calls a replace-transaction command to replace the internal transaction with an external transaction corresponding to an external software application such that the first message is locked during the replacement, preventing other users from accessing the message during the replacement.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Embodiments described herein are directed to instantiating a virtualized instance of a queue manager configured to provide a plurality of supplemental queue manager commands for performing message access. In one embodiment, a computer system instantiates a queue manager configured to process a plurality of existing queue manager commands on messages in a message queue. The computer system instantiates a virtualized instance of a queue manager in a virtual layer associated with the queue manager in the computing system. The virtualized queue manager instance provides supplemental queue manager commands usable in addition to existing queue manager commands, such that the queue manager can be used to implement the supplemental commands without substantial modification. The computer system receives an indication that a message in a message queue is to be accessed according to a specified command provided by the instantiated virtualized queue manager instance that is not natively supported by the queue manager and the queue manager performs the specified supplemental command as indicated by the received indication by performing one or more existing queue manager commands.

In another embodiment, a computer system performs a method for replacing an internal transaction with an external transaction. The computer system receives an indication that a first message in a message queue is to be accessed according to a peek-lock command provided by an instantiated virtualized queue manager instance. The computer system calls a begin-queue-transaction command to initiate an internal transaction internal to the queue manager. The computer system calls a receive-message command to access the first message within the internal transaction. The computer system records the internal transaction identified with a unique identifier in a portion of virtual layer state and locks the first message in the message queue according to the received peek-lock command. The computer system also calls a replace-transaction command to replace the internal transaction with an external transaction corresponding to an external software application such that the first message is locked during the replacement, preventing other users from accessing the message during the replacement.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media including recordable-type storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry or transport desired program code means in the form of computer-executable instructions or data structures and which can be accessed by a general purpose or special purpose computer. Combinations of the above should also be included within the scope of computer-readable media.

However, it should be understood, that upon reaching various computer system components, program code means in the form of computer-executable instructions or data structures can be transferred automatically from transmission media to physical storage media. For example, computer-executable instructions or data structures received over a network or data link can be buffered in RAM within a network interface card, and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 1A:
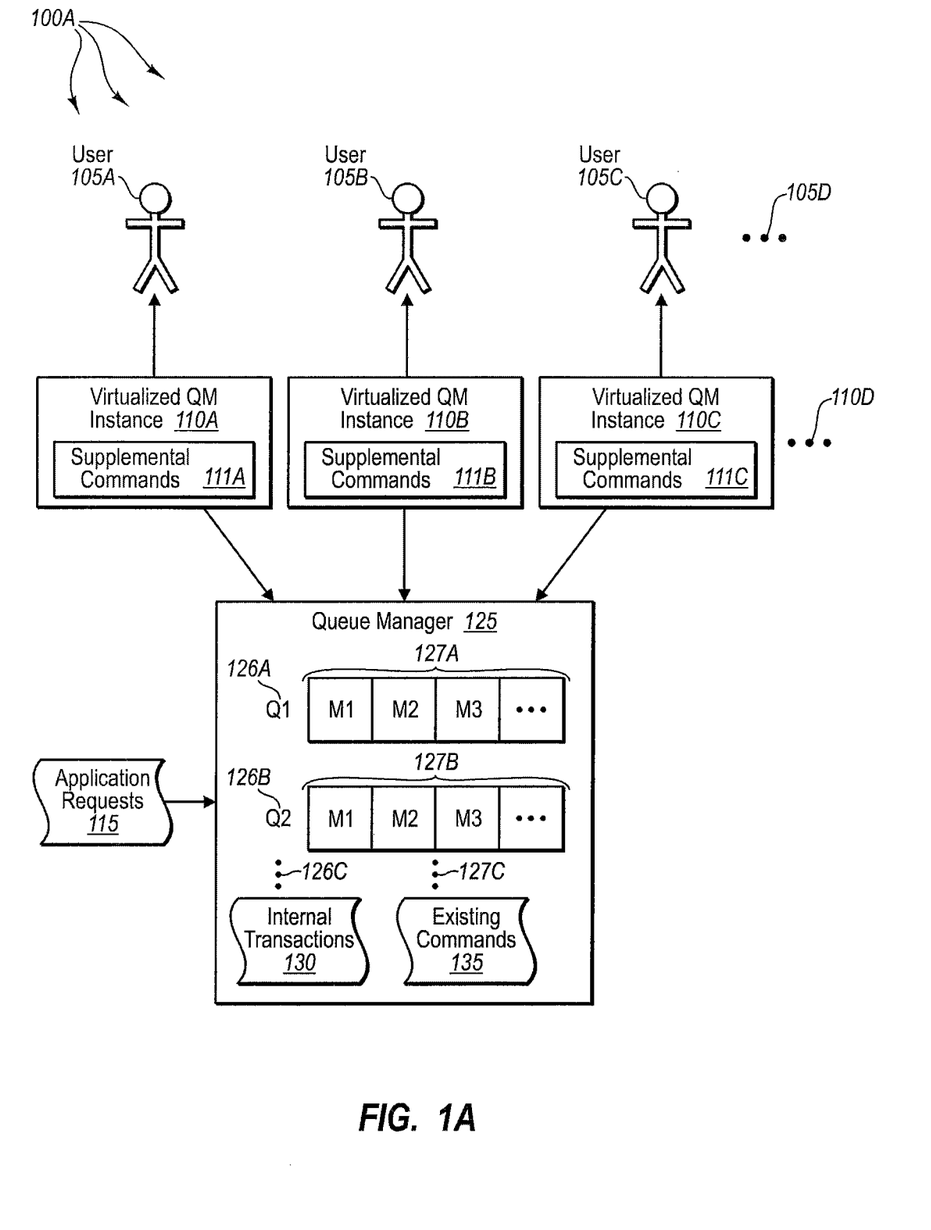
FIGS. 1A & 1B illustrate computer architectures in which embodiments of the present invention may operate including instantiating virtualized instances of a queue manager configured to provide a plurality of supplemental queue manager commands for performing message access.
Figure 1B:
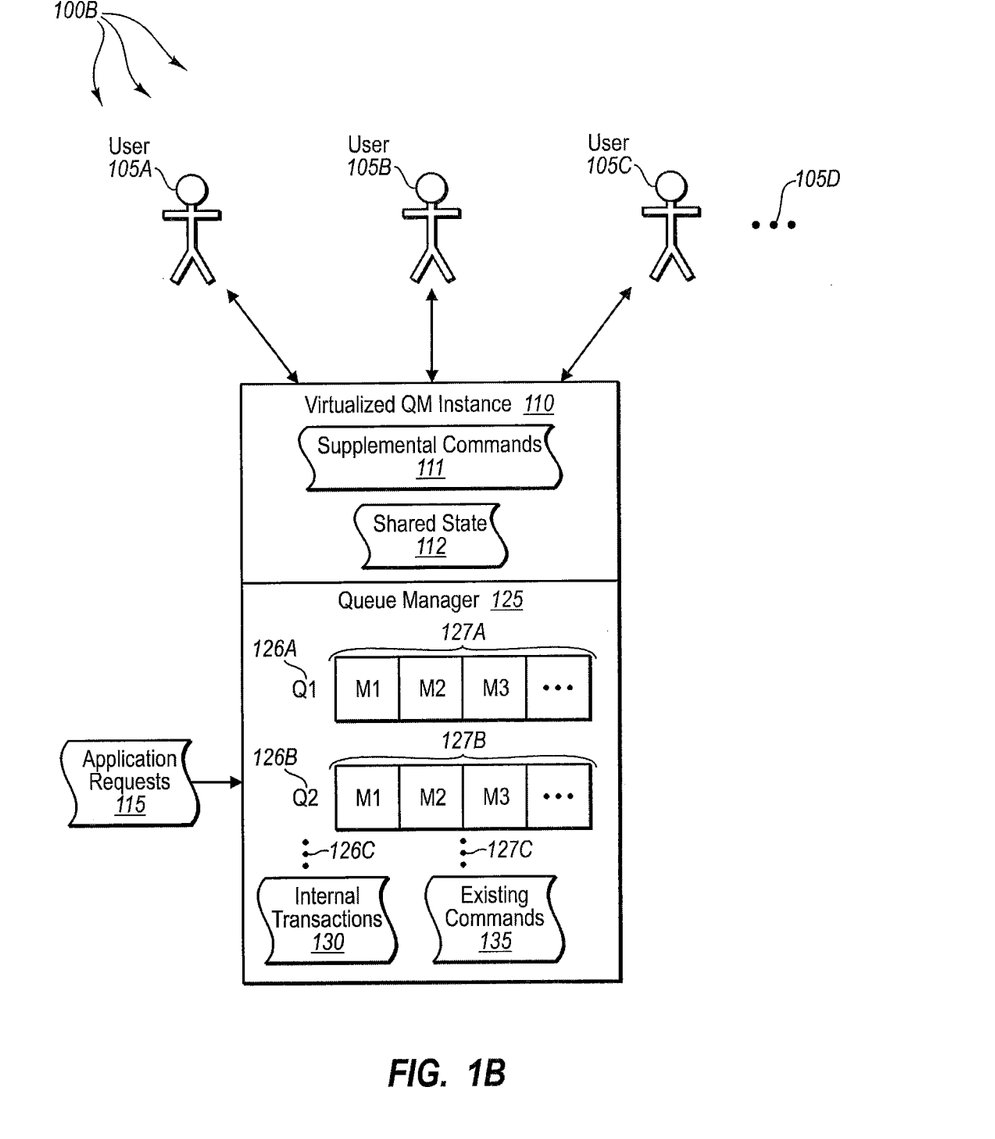

FIGS. 1A & 1B illustrate computer architectures 100A & 100B in which the principles of the present invention may be employed. Computer architecture 100A includes queue manager 125, which itself includes queue 1 (Q1) 126A with messages M1, M2, M3 and others (as illustrated by ellipses), collectively referred to as messages 127A, queue 2 (Q2) with messages 127B and other queues 126C with their corresponding messages 127C. Queue manager (QM) 125 also includes internal transactions 130 and a set of existing commands 135.

In general, queue manager 125 may be any type of inter-application, inter-process or inter-thread communication manager. Queue manager 125 may be configured to pass control and/or content between such applications, processes and/or threads (hereinafter, all objects over which the queue manger has control will be referred to as processes for simplicity). The completion of such inter-process communications may be ensured by using internal and/or external transactions. External transactions span multiple transactional resources (e.g. structured query language (SQL) databases and other queuing systems. Internal transactions (e.g. 130) are generated by and used within the queuing system itself (e.g. within queue manager 125). Internal transactions only involve the local queuing system. Internal transactions provide distinct performance advantages over external transactions in that internal transactions do not require coordination with other transactional systems.

Transactions, in general, are series of communications that are guaranteed to be successful. For example, it may be advantageous in an asynchronous system for a process to be able to access a message at the time most convenient for the process. Thus, another process (P2) may be able to post a message (M1) in a message queue (e.g. Q1 126A) that is subsequently accessed at a later time by the first process (P1). If the message is accessed within a transaction, the message will not be permanently removed from the queue until the queue manager receives notification that the message was successfully accessed. In this manner, it is assured that P2's message M1 will either be successfully accessed by P1, or that the message will remain on the queue. In some cases, the message may only remain on the queue until a certain time (e.g. a timeout period) has been reached. It should be noted that processes may access messages without transactions. However, in such cases, the guarantees of transaction-based message access are not provided. In some cases, queue manager 125 may be located and run on a single computing system. In other cases, queue manager 125 may be distributed over a plurality of different computing systems, possibly in different physical locations, communicatively linked by a computing network such as a local area network (LAN) or via the internet. Queue manager 125 may be configured to manage virtually any number of internal or external transactions. Such transactions or other data requests may be received by queue manager 125 as application requests 115. Other, internal requests may be received from internal transactions 130 created by the queue manager as requested by various software applications.

Existing commands 135 may include those commands, primitives or semantics that are natively supported by queue manager 125. For example, queue manager 125 may natively support the following primitive: "Receive-message" with "Transaction" and "Out Message" as possible arguments or values that can be passed with the command (hereinafter syntactically stated as follows: "Receive-message(Transaction, out Message)." As used herein, the Receive-message command may be used to return a message from the head of the queue (e.g. Q1 126A), optionally within a transaction. If no transaction is supplied then the message may be read destructively from the queue, such that the message is no longer maintained on the queue. If a transaction is supplied, the message may be read under a transaction. Once the supplied transaction commits (e.g. the transaction is completed), the message is removed from the queue. Otherwise, if the transaction aborts, the message reappears on the queue in the same position as it was before the Receive-message operation. The retrieved message is unavailable for other applications until the transaction outcome is determined.

Existing commands 135 may also include "Receive-message-by-lookupid(Transaction, Lookupid, out Message)." This command or operation may look for the message with the specified lookup identifier (ID) in the queue and return it optionally within a specified transaction. Implications for reading under a transaction are generally the same as in the Receive-message operation. Commands 135 may also include "Begin-queue-transaction(out Transaction)." This command returns a new transaction dispensed by the queuing system's (e.g. queue manager 125) transaction dispenser (i.e. it returns a newly created internal transaction). "Begin-transaction(out Transaction)" may also be included in commands 135 and may be configured to return a new transaction dispensed by a distributed system's transaction dispenser (i.e. it returns a newly created external transaction.

Existing commands 135 may also include "Commit-transaction(Transaction)," which may be configured to commit the specified transaction causing the queue manager and all associated transactional resource managers to make the changes belonging to the specified transaction permanent. "Abort-transaction(Transaction)" may also be included in existing commands 135 and may be configured to abort the specified transaction causing the queue manager and all associated transactional resource managers to rollback any changes made within that transaction. It should be noted that other existing commands may be include in commands 135 and that each command listed above may include more functionality than the functions listed above.

Environment 100 also includes users 105A, 105B, 105C and other users not shown (105D). Each user may be able to access a separate, corresponding virtualized queue manager instance (e.g. virtualized instances 110A, 110B, 110C and 110D, respectively). In other embodiments, as illustrated in FIG. 1B, each user may access the same virtualized queue manager instance 110. Virtualized queue manager instances may include one or more supplemental commands (111A, 111B, 111C) that are usable in addition to existing commands 135. A virtualized instance may be thought of as working on top of or in association with queue manager 125 and may be able to access the functionality of queue manager 125. Furthermore, virtualized instances may be able to access any of queues 126A-C and any of internal transactions 130. Thus, virtualized queue manager instances may be configured to fully interact with queue manager 125 and each of its components. In some cases, a virtualized queue manager may be treated as and may be interacted with as a software application by the queue manager. Moreover, as will be explained in greater detail below, virtualized queue manager instances may be able to provide supplemental functionality to the queue manager with very little or no modification to queue manager 125.

Figure 2:
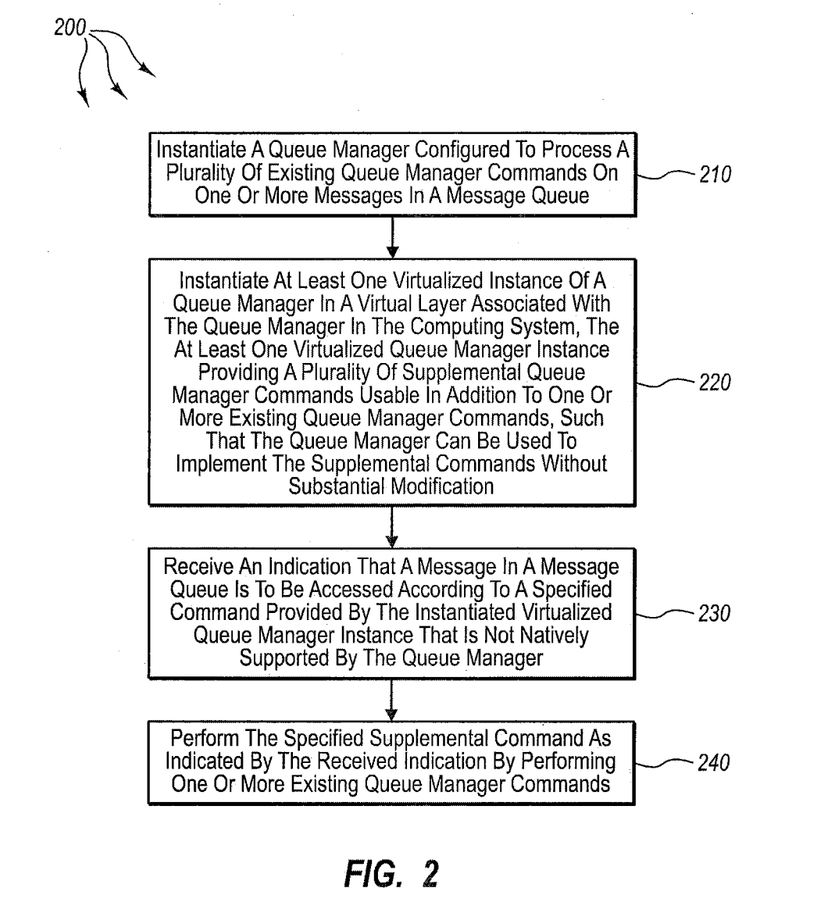
FIG. 2 illustrates a flowchart of an example method for instantiating a virtualized instance of a queue manager configured to provide a plurality of supplemental queue manager commands for performing message access.

FIG. 2 illustrates a flowchart of a method 200 for instantiating a virtualized instance of a queue manager configured to provide a plurality of supplemental queue manager commands for performing message access. The method 200 will now be described with frequent reference to the components and data of environments 100A and 100B of FIGS. 1A and 1B, respectively.

Method 200 includes an act of instantiating a queue manager configured to process a plurality of existing queue manager commands on one or more messages in a message queue (act 210). For example, queue manager 125 may be instantiated and may be configured to process multiple different existing commands 135 on any of messages M1-M3 on message queue 1 (Q1 126A). In some cases, queue manager 125 may already be running as part of an application or operating system on a computing system. Queue manager 125 may be instantiated as a result of receiving a command from a user or computer administrator that such a queue manager is to be started in order to manage inter-process communication.

Method 200 also includes an act of instantiating at least one virtualized instance of a queue manager in a virtual layer associated with the queue manager in the computing system, the at least one virtualized queue manager instance providing a plurality of supplemental queue manager commands usable in addition to one or more existing queue manager commands, such that the queue manager can be used to implement the supplemental commands without substantial modification (act 220). For example, virtualized queue manager instance 111A may be instantiated in a virtual layer associated with queue manager 125. Instance 111A may provide multiple different supplemental queue manager commands usable in addition to existing queue manger commands 135. Using these supplemental commands, the processing capabilities of queue manager 125 may extended with little or no modification to queue manager 125 itself As explained above, each supplemental command (e.g. 111) may comprise a number of queue manager primitives, commands, operations, instructions or semantics. Supplemental commands may be accessed by any of users 105A-C, and may interact with or use any or all of existing commands 135. In some cases, each user may access their own virtualized queue manager instance (e.g. instance 110B for user 105B). In other cases, as in FIG. 1B, user 105 B and the other users may access the same virtualized queue manager instance 110. In some scenarios, it may be more advantageous to instantiate multiple virtual queue manager instances. In others, it may be more advantageous to instantiate a single virtualized queue manager instance. In cases where only one virtualized queue manager instance has been instantiated, other instances may be instantiated on the fly as determined by queue manager 125 and/or the computer system on which manager 125 is operating. In other cases, the decision as to how many instances are to be instantiated may be made automatically and may be adjusted dynamically as computer resources change.

Returning to FIG. 2, method 200 further includes an act of receiving an indication that a message in a message queue is to be accessed according to a specified command provided by the instantiated virtualized queue manager instance that is not natively supported by the queue manager (act 230). For example, queue manager 125 may receive an indication that message M3 of Q2 (126B) is to be accessed according to a specified command provided by, for example, virtualized queue manager instance 110C, that is not natively supported by queue manager 125.

In some embodiments, supplemental commands 111(A-C) may include various locking semantics or commands including a "Peek-lock-message(out Message)" command, an "Unlock-message(Message)" command, and a "Delete-message(Message, Transaction)" command. The Peek-lock-message command may be configured to lock and return a message (e.g. M1) from the head of a queue (e.g. Q1 126A). The message is still physically present in the queue but is unavailable for other applications. The Unlock-message command may be configured to unlock a previously locked message in the queue making it available for all other applications. The message may be placed in the same position as it was before the message was locked. The Delete-message command may be configured to delete a previously locked message from the queue optionally within a transaction supplied by an application. If a transaction is supplied in the command, then the actual removal of the message from the queue is tied to the supplied transaction.

Working with a virtualized queue manager instance (e.g. 110C), queue manager 125 may be able to perform any of the supplemental commands including the Peek-lock-message command by performing one or more existing commands 135. The Peek-lock-message command may be performed by implementing one or more existing queue manager commands 135 including the following: calling Begin-queue-transaction to initiate an internal transaction internal to the queue manager, calling Receive-message to access the message within the internal transaction, recording the association between the internal transaction identified with a unique identifier and the accessed message in a portion of virtual layer state (e.g. 112). Shared state 112 may include a hash table which may be used to store the internal transaction's unique identifier and the message that is accessed within this transaction.

As indicated above, other commands provided by virtualized queue manager instances 110A-C may include an "Unlock-message" command. Similar to the Peek-lock command, queue manager 125 may work with a virtualized queue manager instance 110 to perform the Unlock-message command by implementing one or more existing queue manager commands 135 including the following: retrieving a recorded identifier from a hash table identifying an internal transaction configured to perform operations in relation to a message, and calling the Abort-transaction command to abort the identified internal transaction. Upon aborting the internal transaction, the message is automatically unlocked.

The supplemental Delete-message command may be performed in one manner when an external transaction has not been supplied by implementing one or more existing queue manager commands 135 including the following: determining that an external transaction has not been supplied with the delete message command, retrieving a recorded identifier from a hash table identifying an internal transaction configured to perform operations in relation to a message and calling the Commit-transaction command to commit the identified internal transaction such that all changes belonging to the internal transaction are carried out.

The supplemental Delete-message command may be performed in another manner when an external transaction has been supplied by implementing one or more existing queue manager commands 135 including the following: determining that an external transaction has been supplied with the delete message command, retrieving a recorded identifier identifying an internal transaction configured to perform operations in relation to a message, calling the Abort-transaction command to abort the internal transaction and unlock the message, and calling the Receive-message-by-lookupid command to look for the message with the recorded identifier in the queue and return the message within a user-specified external transaction. Thus, each of the supplemental commands provided by a virtualized queue manager instance may be performed by queue manager 125 using some implementation of existing commands 135. This allows locking semantics and commands to be implemented on queue manager 135 with little or no modification to the queue manager.

Method 200 includes an act of the virtualized queue manager performing the specified supplemental command as indicated by the received indication by performing one or more existing queue manager commands (act 240). For example, as explained above, virtualized queue manager 110 performs the specified supplemental command (any one or more of Peek-lock message, Unlock-message and Delete-message) as indicated by the received indication by performing one or a combination of existing queue manager commands 135.

Figure 3:
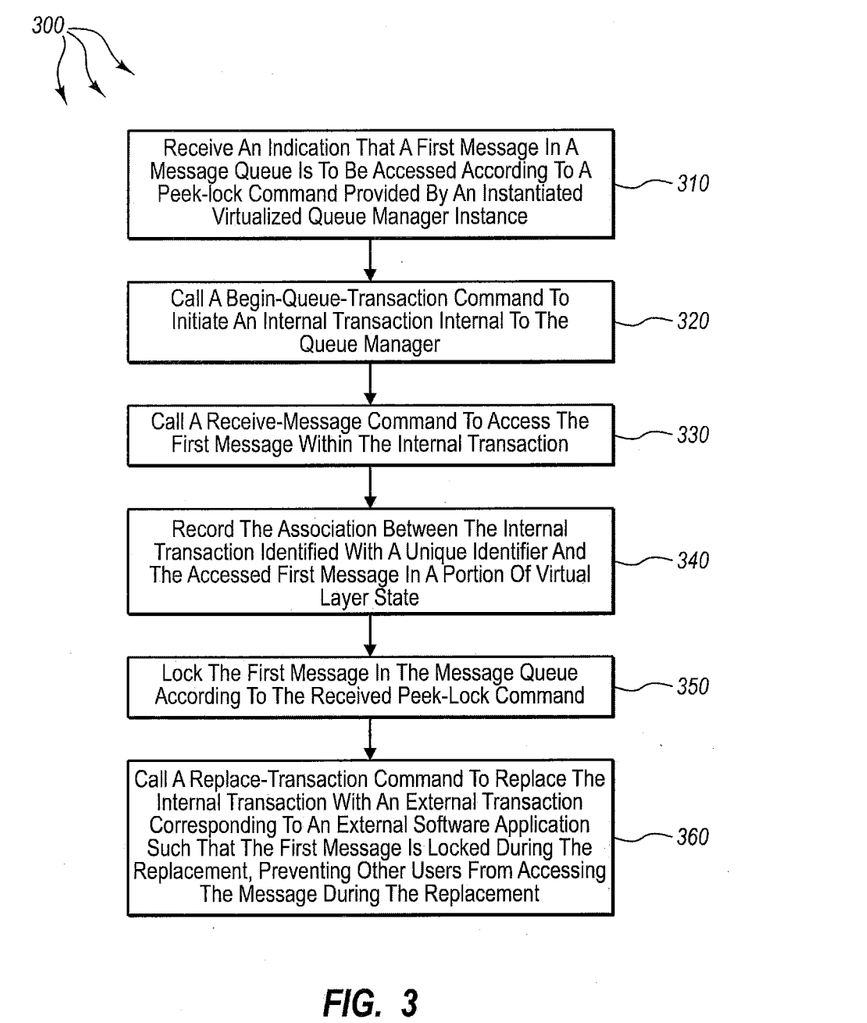
FIG. 3 illustrates a flowchart of an example method for replacing an internal transaction with an external transaction.

Turning now to FIG. 3, FIG. 3 illustrates a flowchart of a method 300 for replacing an internal transaction with an external transaction. The method 300 will now be described with frequent reference to the components and data of environments 100A and 100B of FIGS. 1A and 1B, respectively and environment 400 of FIG. 4.

Method 300 includes an act of receiving an indication that a first message in a message queue is to be accessed according to a peek-lock command provided by an instantiated virtualized queue manager instance (act 310). For example, queue manager 125 may receive an indication (e.g. from user 105A) indicating that message M1 of Q1 (126A) is to be accessed according to the Peek-lock-message command provided by virtualized queue manager instance 110A. Similar to scenarios described above, virtualized queue manager instance 110A may provide supplemental commands usable by user 105A to perform various (locking) features on messages in different queues in the queue manager by leveraging existing queue manager commands 135.

Additionally or alternatively, another virtualized queue manager (e.g. 110A) may be configured to call, in a second call, the Receive-message command to receive another message from the head of the queue in a second internal transaction, determine that a second, different message is at the head of the queue and receive the second message in response to the second call. It will be understood that, along these lines, multiple different messages may be received using various, subsequent and possibly concurrent command calls.

Method 300 includes an act of calling a begin-queue-transaction command to initiate an internal transaction internal to the queue manager (act 320). For example, after receiving an indication that a Peek-lock-message command is to be performed, queue manager 125 may call the Begin-queue-transaction command of existing commands 135 to initiate an internal transaction internal to queue manager 125.

Method 300 includes an act of calling a receive-message command to access the first message within the internal transaction (act 330). For example, upon initiating the internal transaction, queue manager 125 may call the Receive-message command of existing commands 135 to access message M1 within the initiated internal transaction.

Next, method 300 includes an act of recording the association between the internal transaction identified with a unique identifier and the accessed first message in a portion of virtual layer state (act 340). For example, queue manager 125 may record the initiated internal transaction identified with the unique identifier in shared state 112. Additionally or alternatively, shared state 112 may include a hash table which may be used to store the internal transaction's unique identifier and the message that is accessed within this transaction.

Method 300 also includes an act of locking the first message in the message queue according to the received peek-lock command (act 350). For example, queue manager 125 may lock message M1 in the message queue based on having received the Peek-lock-message command from virtualized queue manager instance 110A. Turning to timeline 101 of FIG. 4A, act 350 may coincide with time 105 (T105) when Consumer A (e.g. user 105A) locks message M1. At a (arbitrarily) later point in time (T110), Consumer A may abort the initiated internal transaction by calling the supplemental command 'Delete-Message' in a transaction. The virtualized queue manager instance 110 may execute this command by aborting the internal transaction and re-receiving the message (e.g. M1) within the external transaction. In general, the time between this abort and re-receive is where a race condition may occur (e.g. time 106).

Figure 4A:
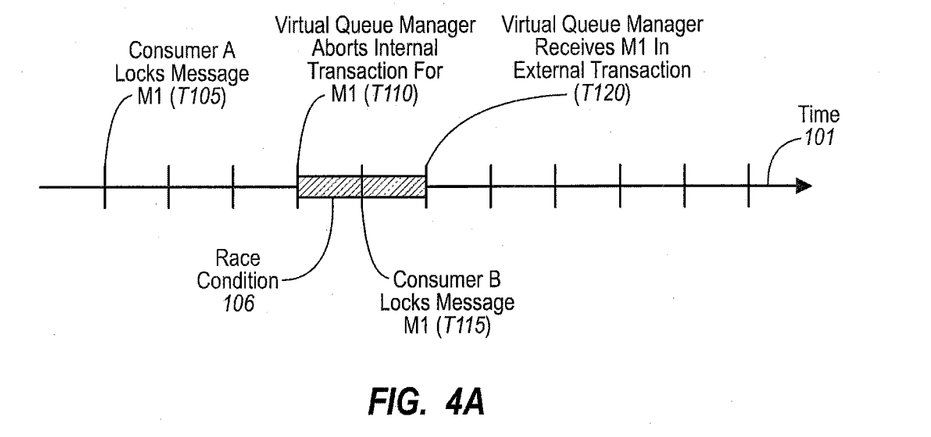
FIGS. 4A & 4B illustrate embodiments of the present invention in which an internal transaction is replaced with an external transaction.

During this time period between aborting the internal transaction and receiving message M1 in an external (application) transaction (time T120), Consumer B (e.g. user 105B) may access and lock message M1 at time T115. The message's availability to others during the time period between an internal transaction abort and an external transaction initiation may cause communication errors in some scenarios. It should be noted that the race condition described above may only be unavoidable (without transaction replacement) in scenario 100A where there are multiple virtualized queue managers. In scenario 100B, since the lock state is shared (in shared state 112, for example), the race condition may be avoided by having logic in the single virtualized queue manager 110 that checks if a consumer is holding a lock before reading the message.

Method 300 includes an act of calling a replace-transaction command to replace the internal transaction with an external transaction corresponding to an external software application such that the first message is locked during the replacement, preventing other users from accessing the message during the replacement (act 360). For example, queue manager 125 may call the Replace-transaction command to replace the initiated internal transaction with an external transaction corresponding to an external software application. Thus, referring to timeline 101 of FIG. 4B, Consumer A may lock message M1 at time T105, as was the case in FIG. 4A. Next, at time T150A, Consumer A begins replacing the initiated internal transaction with an external (application) transaction for message M1. Message M1 stays locked during the replacing operation (as indicated by the dotted box on the timeline). During this time, Consumer B is unable to access message M1 (e.g. time T150B) because the message is locked to outside users.

Figure 4B:
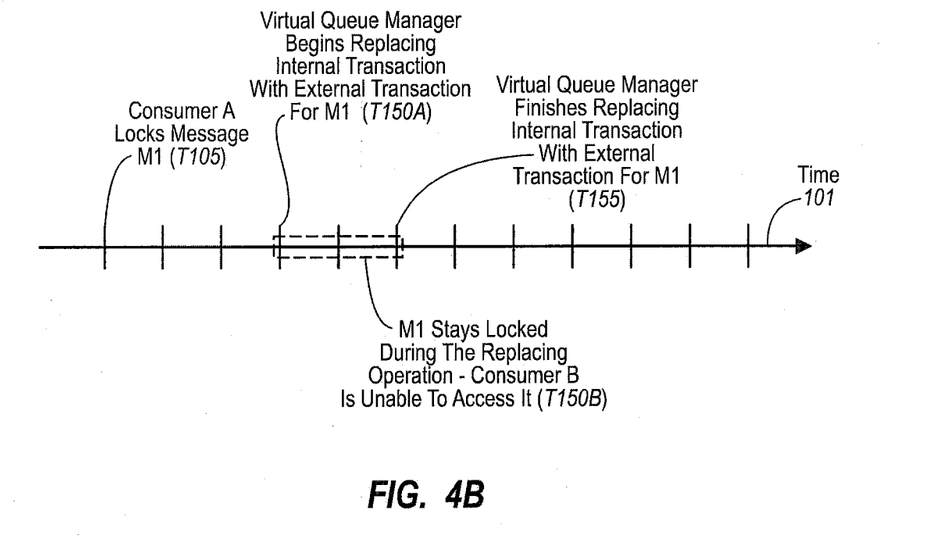

For a single virtualized queue manager instance 110, transaction replacement may be avoided, as the virtualized queue manager will ensure that Consumer B does not receive the message while consumer A is processing it. In cases where multiple virtualized queue manager instances have been instantiated, the virtualized queue manager instance may ensure that the message is unavailable to other consumers by not allowing the message to leave a transaction. Consequently, the internal transaction is replaced with an external transaction.

Thus, virtualized queue manager instances may be instantiated to provide supplemental functionality to a queue manager with very little or no modification to queue manager. Moreover, internal transactions may be replaced with external transactions to avoid race conditions that would allow other users to access messages at improper times within a communication sequence.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a computing system, a method for instantiating a virtualized instance of a queue manager configured to provide a plurality of supplemental queue manager commands for performing message access, the method comprising:
    an act of instantiating a queue manager configured to process a plurality of existing queue manager commands on one or more messages in a message queue;
    an act of instantiating at least one virtualized instance of a queue manager in a virtual layer associated with the queue manager in the computing system, the at least one virtualized queue manager instance providing a plurality of supplemental queue manager commands usable in addition to one or more existing queue manager commands, such that the queue manager can be used to implement the supplemental commands without substantial modification, wherein each supplemental command provides a specified combination of existing queue manager commands that are to be performed by the virtualized queue manager, the supplemental commands themselves not being natively supported by the queue manager;
    an act of receiving an indication that a message in a message queue is to be accessed according to a specified supplemental command provided by the instantiated virtualized queue manager instance that is not natively supported by the queue manager; and
    an act of the virtualized queue manager performing the specified supplemental command as indicated by the received indication by performing one or more existing queue manager commands.

2. The method of claim 1, wherein the command specified in the received indication comprises a peek-lock message command.

3. The method of claim 2, further comprising performing the peek-lock command by implementing one or more existing queue manager commands including the following:
an act of calling a begin-queue-transaction command to initiate an internal transaction internal to the queue manager;
an act of calling a receive-message command to receive a first message within the internal transaction; and
an act of recording the internal transaction identified with a unique identifier in a portion of virtual layer state.

4. The method of claim 3, wherein the portion of virtual layer state includes a hash table.

5. The method of claim 3, wherein the begin-queue-transaction command and the receive-message command comprise existing queue manager commands.

6. The method of claim 1, wherein the command specified in the received indication comprises an unlock message command.

7. The method of claim 6, further comprising performing the unlock message command by implementing one or more existing queue manager commands including the following:
an act of retrieving a recorded identifier identifying an internal transaction configured to perform operations in relation to a message; and
an act of calling an abort-transaction command to abort the identified internal transaction, wherein the message is automatically unlocked upon aborting the internal transaction.

8. The method of claim 1, wherein the command specified in the received indication comprises a delete message command.

9. The method of claim 8, further comprising performing the delete message command by implementing one or more existing queue manager commands including the following:
an act of determining that an external transaction has not been supplied with the delete message command;
an act of retrieving a recorded identifier identifying an internal transaction configured to perform operations in relation to a message; and
an act of calling a commit-transaction command to commit the identified internal transaction such that all changes belonging to the internal transaction are carried out.

10. The method of claim 8, further comprising performing the delete message command by implementing one or more existing queue manager commands including the following:
an act of determining that an external transaction has been supplied with the delete message command;
an act of retrieving a recorded identifier identifying an internal transaction configured to perform operations in relation to a message;
an act of calling an abort-transaction command to abort the internal transaction and unlock the message; and
an act of calling a receive-message-by-lookupid command to look for the message with the recorded identifier in the queue and return the message within a user-specified external transaction.

11. The method of claim 1, wherein a virtualized queue manager instance is instantiated for each user that accesses the queue manager.

12. The method of claim 1, wherein each supplemental command comprises a queue manager primitive.

13. The method of claim 1, wherein the queue manager is incapable of performing a peek-lock command.

14. A computer program product for implementing a method for replacing an internal transaction with an external transaction, the computer program product comprising one or more computer-readable storage media having stored thereon computer-executable instructions that, when executed by one or more processors of the computing system, cause the computing system to perform the method, the method comprising:
an act of receiving an indication that a first message in a message queue is to be accessed according to at least one of a plurality of supplemental commands including least a peek-lock command provided by an instantiated virtualized queue manager instance, the virtualized queue manager being instantiated in addition to at least one existing queue manager, wherein each of the plurality of supplemental commands provides a specified combination of existing queue manager commands that are to be performed by the virtualized queue manager, the supplemental commands themselves not being natively supported by the queue manager;
an act of calling a begin-queue-transaction command to initiate an internal transaction internal to the queue manager;
an act of calling a receive-message command to access the first message within the internal transaction;
an act of recording the association between the internal transaction identified with a unique identifier and the accessed first message in a portion of virtual layer state;
an act of locking the first message in the message queue according to the received peek-lock command; and
an act of calling a replace-transaction command to replace the internal transaction with an external transaction corresponding to an external software application such that the first message is locked during the replacement, preventing other users from accessing the message during the replacement.

15. The computer program product of claim 14, wherein the replace-transaction command is a supplemental command provided by the instantiated virtualized queue manager instance.

16. The computer program product of claim 14, further comprising an act of calling an abort-transaction command to abort the internal transaction.

17. The computer program product of claim 14, further comprising:
an act of calling, in a second call, the receive-message command to receive another message from the head of the queue in a second internal transaction;
an act of determining that a second, different message is at the head of the queue; and
an act of receiving the second message in response to the second call.

18. The computer program product of claim 14, wherein a plurality of users access a single virtualized queue manager instance.

19. The computer program product of claim 14, wherein a plurality of users access a corresponding plurality of virtualized queue manager instances.

20. A computer system comprising the following:
one or more processors;
system memory;
one or more computer-readable storage media having stored thereon computer-executable instructions that, when executed by the one or more processors, causes the computing system to perform a method for instantiating a virtualized instance of a queue manager configured to provide a plurality of supplemental queue manager commands for performing message access, the method comprising the following:
an act of instantiating a queue manager configured to process a plurality of existing queue manager commands on one or more messages in a message queue;

an act of instantiating at least one virtualized instance of a queue manager in a virtual layer associated with the queue manager in the computing system, the at least one virtualized queue manager instance providing a plurality of supplemental queue manager commands usable in addition to one or more existing queue manager commands, such that the queue manager can be used to implement the supplemental commands without substantial modification, wherein each supplemental command provides a specified combination of existing queue manager commands that are to be performed by the virtualized queue manager, the supplemental commands themselves not being natively supported by the queue manager;

an act of receiving an indication that a message in a message queue is to be accessed according to a specified supplemental command provided by the instantiated virtualized queue manager instance that is not natively supported by the queue manager; and an act of the virtualized queue manager performing the specified command as indicated by the received indication by performing one or more existing queue manager commands.

\* \* \* \* \*